(12) United States Patent
Lai et al.

(10) Patent No.: US 6,621,473 B2
(45) Date of Patent: Sep. 16, 2003

(54) CONSTRUCTION OF TOUCH SCREEN

(75) Inventors: Cheng-Shing Lai, Taipei (TW); Yun Gu, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 195 days.

(21) Appl. No.: 09/780,359

(22) Filed: Feb. 12, 2001

(65) Prior Publication Data
US 2002/0110465 A1 Aug. 15, 2002

(51) Int. Cl.[7] .................................................. G09G 3/00
(52) U.S. Cl. ........................................ 345/32; 345/173
(58) Field of Search .................................. 345/173, 32

(56) References Cited

U.S. PATENT DOCUMENTS 6,229,694 B1 * 5/2001 Kono ........................... 361/683
6,453,173 B1 * 9/2002 Reber et al. ................. 455/557

* cited by examiner

*Primary Examiner*—Steven Saras
*Assistant Examiner*—William C. Spencer
(74) *Attorney, Agent, or Firm*—Birch, Stewart, Kolasch & Birch, LLP

(57) ABSTRACT

A touch screen construction provides a plurality of brilliant command icons for a user to easily operate an electronic device. The icons are marked on an icon layer mounted between a top touch layer and a bottom display layer. A cool light layer is located under the icon layer for illuminating the command icons. The user can see the icons clearly and mistaken operation of the electronic device can be prevented even in the dark.

18 Claims, 3 Drawing Sheets

CONSTRUCTION OF TOUCH SCREEN

BACKGROUND OF THE INVENTION

1. Field of Invention

The present invention generally relates to a construction of touch screen, and more particularly relates to a touch screen applicable to an electronic data processing device for displaying information and providing brilliant icons for touch control.

2. Related Art

Electronic data processing devices, such as notebook computers, mobile phones, personal digital assistants and handheld computers, all include liquid crystal displays for displaying information of the devices for the user to see. There is also a kind of touch screen that can be used with fingers or a touch pen pressing on the screen for executing related commands. The touch screen makes the electronic device more compact by omitting input keys, so that the size of the PDA or handheld computer can be further reduced.

Currently, a touch screen mainly includes a touch layer and a display layer (liquid crystal display module). A user touching the touch layer on certain positions where the display layer displays relative information will make the device execute certain operations. If a command is arranged under several processing layers of touch operation, the user then has to press several strokes to reach the command. In order to simplify the operation, a PDA or palm computer may be pasted with some icon stickers at the rim of the touch screen for a user to operate some common commands without the need of multiple pressings.

There is a need that the user has to operate electronic devices in the dark and watch information on the screen. A back light layer can be used for illumination from the back of the LCD. The back light layer can be a plurality of light emitting diodes (LEDs) located under the rim of the display layer. The LEDs will illuminate the display layer when a specific key is pressed so as to help a user viewing the content. The icon stickers pasted on the rim of the display layer are small so as to prevent them from hindering too much of the display area. Further, when the back light layer illuminated, the light will not pass through the stickers. Therefore, the icon stickers are hard to identify in the back light condition. Therefore, they are easily mistaken and cause inconvenience of operation.

SUMMARY OF THE INVENTION

It is therefore a primary object of the present invention to provide a touch screen that can clearly display command icons.

A touch screen according to the present invention includes a touch layer, an icon layer, a cool light layer and a display layer. The icon layer is located between the touch layer and the display layer. The cool light layer is located between the icon layer and the display layer. The icon layer is separated into a plurality of sections in which a plurality of command icons representing operation shortcuts are located. Accordingly, the cool light layer directly provides light to the icon layer and helps a user see the icons when operating in the dark. Therefore, mistaken operations can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus is not limitative of the present invention, and wherein.

DETAILED DESCRIPTION OF THE INVENTION

Figure 3:
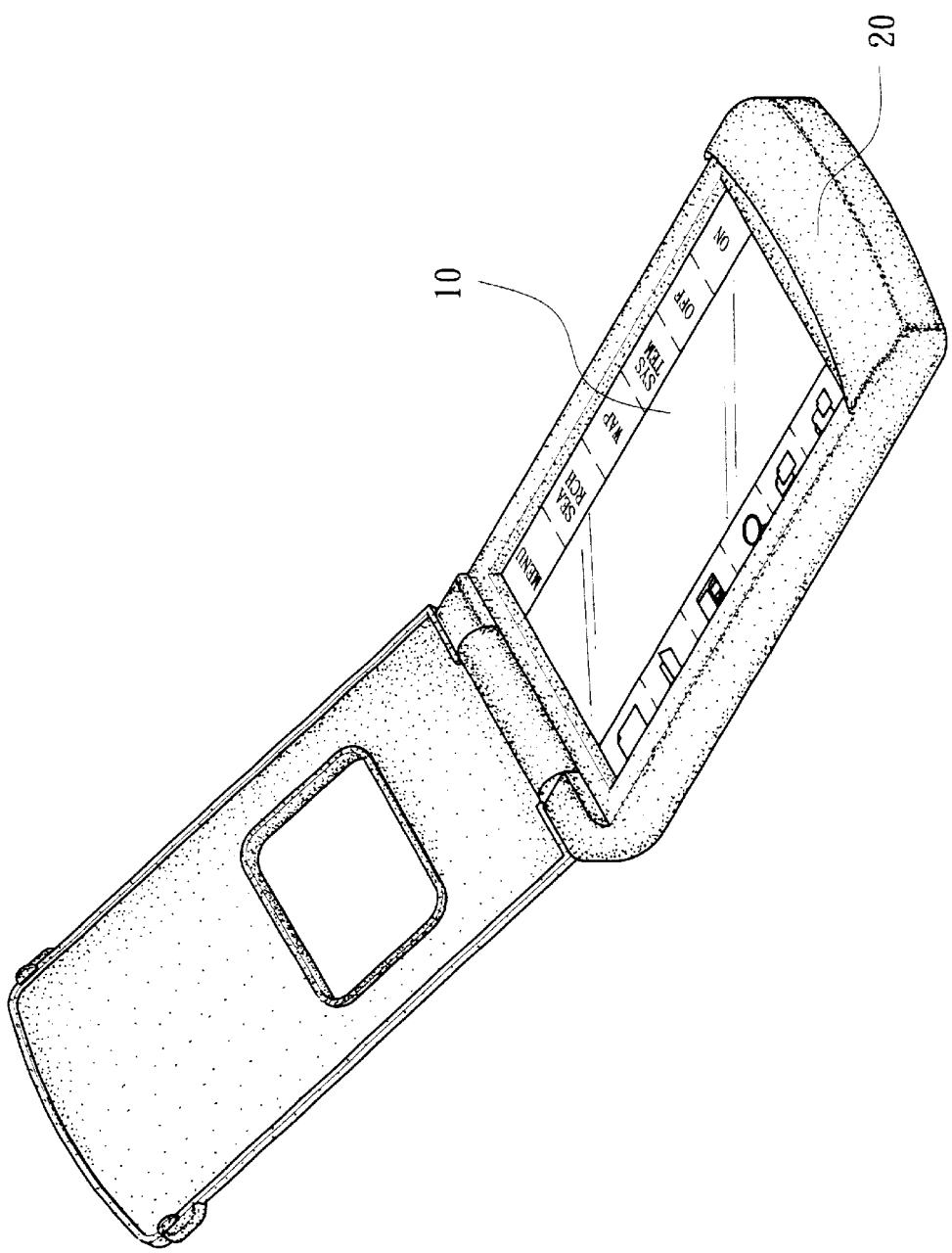
FIG. 3 is an application example of the present invention.

A touch screen structure according to the present invention is applicable to an electronic device 20 (as shown in FIG. 3) for showing information and receiving user's commands through touch control. The electronic device can be a personal digital assistant, a handheld computer, a mobile phone or the like.

Figure 1:
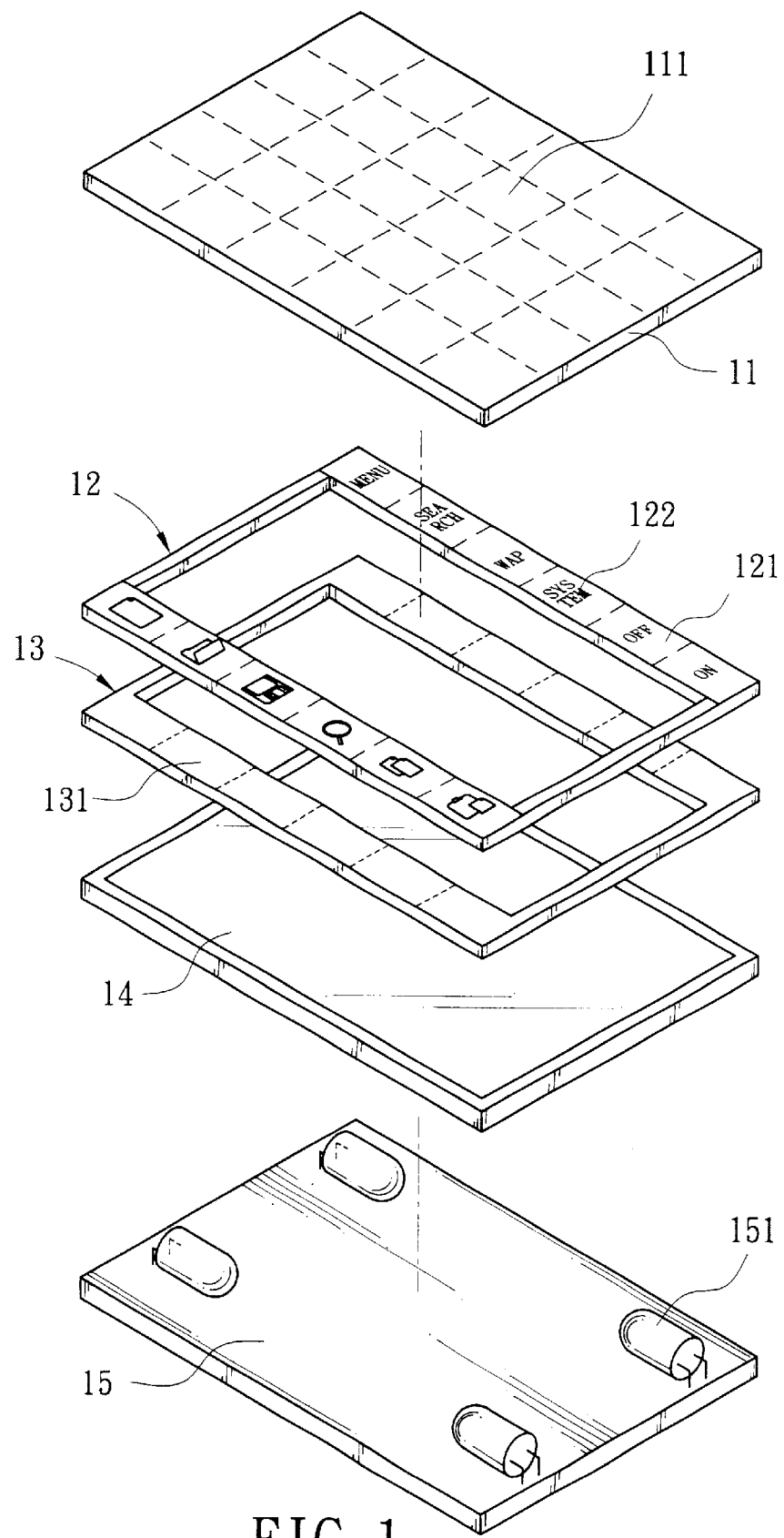
FIG. 1 is an exploded view of a touch screen structure of the present invention.

As shown in FIG. 1, a touch screen 10 according to the present invention includes a touch layer 11, an icon layer 12, a cool light layer 13, a display layer 14 and a back light layer 15.

The touch layer is a frame member divided into a plurality of matrix sections 111. The grid of the matrix sections 111 shown in the drawing is only for explanatory purpose, and is actually invisible. The layer 11 is located on top of the touch screen 10 for receiving touch control of the user. The user using an unshown touch pen on the touch layer 11 on specific matrix sections 111 will trigger corresponding commands to the electronic device 20 for executing the desired operations.

The icon layer 12 is a frame member matching with the size of the touch layer 11 and is located thereunder. A plurality of sections 121 are allocated on the icon layer 12. Each section 121 is marked with a command icon 122 representing a specific operation command of the electronic device 20. The command icons 122 can be words or simple figures of "Menu", "Search", "Swap", "System", "On", "Off" and so on. The words or figures are preferably in outline so as to let the back light pass through. Of course, the touch layer 11 has matrix sections 111 corresponding to the command icons 122 for receiving the touch control.

The cool light layer 13 is an electro-luminescent element matching with the size of the icon layer 12 and is located thereunder. The cool light layer 13 includes a plurality of light regions 131 corresponding to the icon sections 121 of the icon layer 12. The light regions 131 are powered by a power source of the electronic device 20, and will illuminate the icon layer 12 when the electronic device 20 is turned on. Each light region 131 can provide a specific color of light to make its corresponding command icon 122 distinctive from others so that the user can easily identify the icons by their different colors.

The display layer 14 is a liquid crystal display matching with the size of the touch layer 11. The display layer 14 is located under the cool light layer 13, and electrically communicates with the electronic device 20 for display of information.

The back light layer 15 is located under the display layer 14, and includes a plurality of light emitting elements 151 located adjacent to the rim of the display layer 14. The light emitting elements 151 can be light emitting diodes for illuminating the display layer 14.

Figure 2:
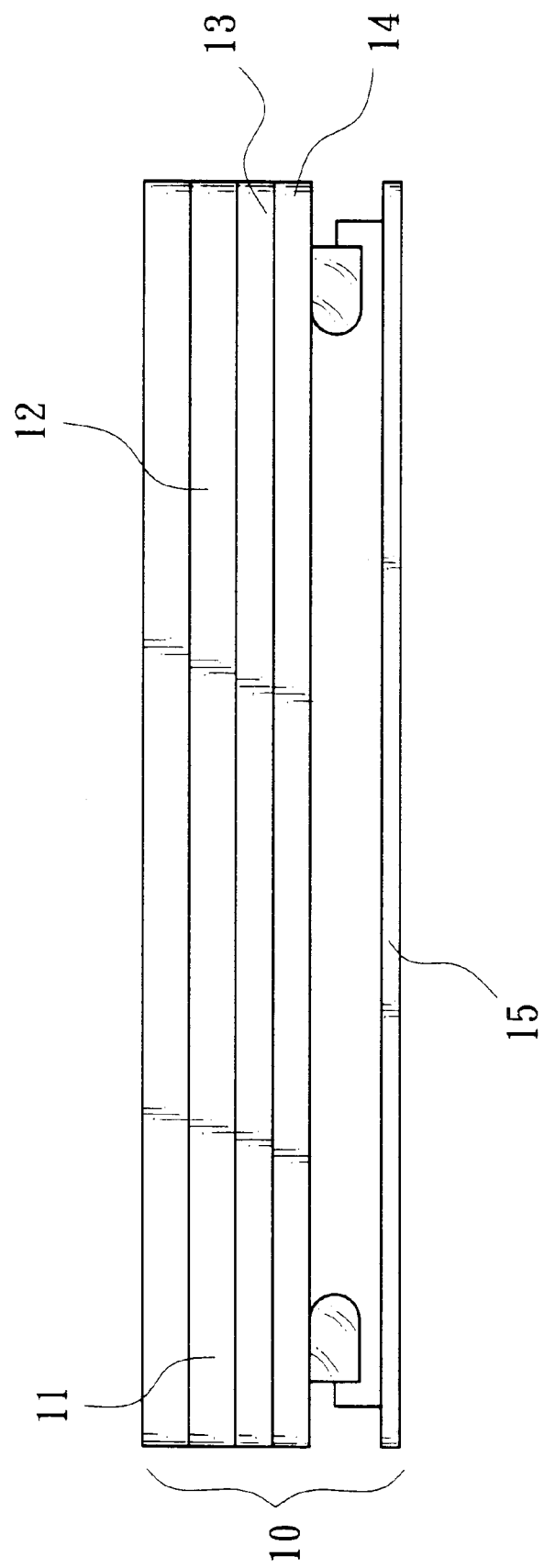
FIG. 2 is a side view of a touch screen structure of the present invention.

As shown in FIGS. 1, 2 and 3, a touch screen 10 according to the present invention is applicable to an electronic device 20 for display of information. When the electronic device 20 is being used, the cool light layer 13 provides light passing through the icon layer 12 for illuminating the command icons 122. Therefore, the user can easily recognize the icons 122 for pressing the touch layer 11 and operating the device 20. The cool light layer 13 can provide different colors of light for different command icons 122, so as to further help identification of the icons 122 in the dark.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A touch screen for an electronic device, comprising:
    a touch layer for generating command signals to said electronic device by touch of a user;
    an icon layer, located under said touch layer, including a plurality of sections each marked with a command icon;
    a cool light layer, located under said icon layer, for illuminating said icon layer, the cool light layer being a frame shape; and
    a display layer, located under said cool light layer, communicating with said electronic device for display of information.

2. The touch screen according to claim 1, wherein said electronic device is a personal digital assistant.

3. The touch screen according to claim 1, wherein said electronic device is a palm computer.

4. The touch screen according to claim 1, wherein said electronic device is a mobile phone.

5. The touch screen according to claim 1, wherein said touch layer comprises a plurality of sections corresponding to said sections of said icon layer.

6. The touch screen according to claim 1, wherein said icon layer is a frame shape.

7. The touch screen according to claim 1, wherein the command icons of said icon layer are words.

8. The touch screen according to claim 7, wherein said words of the command icons are outlined.

9. The touch screen according to claim 1, wherein the command icons of said icon layer are characters.

10. The touch screen according to claim 9, wherein said the characters of the icons are outlined.

11. The touch screen according to claim 1, therein the command icons of said icon layer are figures.

12. The touch screen according to claim 11, wherein said figures of the icons are outlined.

13. The touch screen according to claim 1, wherein said cool light layer is an electroluminescent element.

14. The touch screen according to claim 1, wherein said cool light layer comprises a plurality of light regions corresponding to sections of said icon layer for emitting different colors of light.

15. The touch screen according to claim 1, wherein said display layer is a liquid crystal display.

16. The touch screen according to claim 1, further comprising a back light layer located under said display layer for illuminating the same.

17. The touch screen according to claim 16, wherein said back light layer comprises a plurality of light emitting elements located adjacent to rim of said display layer.

18. The touch screen according to claim 17, wherein said light emitting elements are light emitting diodes.

* * * * *